(12) United States Patent
Gurunathan et al.

(10) Patent No.: US 11,791,730 B2
(45) Date of Patent: Oct. 17, 2023

(54) NON-ISOLATED SINGLE INPUT DUAL-OUTPUT BI-DIRECTIONAL BUCK-BOOST DC-DC CONVERTER

(71) Applicant: BLOOM ENERGY CORPORATION, San Jose, CA (US)

(72) Inventors: Ranganathan Gurunathan, San Jose, CA (US); Rakesh Roy, San Jose, CA (US); Bala Subrahmanyam Kuchibhatla, San Jose, CA (US); Srinivas Rao Potta, San Jose, CA (US); Deepak Balakrishnan, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/737,225

(22) Filed: May 5, 2022

(65) Prior Publication Data
US 2023/0045065 A1 Feb. 9, 2023

Related U.S. Application Data

(60) Provisional application No. 63/188,011, filed on May 13, 2021.

(51) Int. Cl.
*H02M 3/158* (2006.01)
*H01M 8/04537* (2016.01)
(Continued)

(52) U.S. Cl.
CPC ..... *H02M 3/1582* (2013.01); *H01M 8/04567* (2013.01); *H01M 8/04626* (2013.01);
(Continued)

(58) Field of Classification Search
None
See application file for complete search history.

(56) References Cited

U.S. PATENT DOCUMENTS

| | | | | |
|---|---|---|---|---|
| 6,636,022 | B2 * | 10/2003 | Sluijs | H02M 3/158 323/267 |
| 7,061,214 | B2 | 6/2006 | Mayega et al. | |

(Continued)

OTHER PUBLICATIONS

E. C. Dos Santos Jr., Single-input dual-output dc-dc buck converter, IEEE International Symposium on Industrial Electronics May 31, 2012, Brazil.
(Continued)

*Primary Examiner* — Jeffery S Zweizig
(74) *Attorney, Agent, or Firm* — Kanika Radhakrishnan; Evergreen Valley Law Group

(57) ABSTRACT

Various embodiments may provide non-isolated single-input dual-output (SIDO) bi-directional buck-boost direct current (DC) to DC (DC-DC) converters. Various embodiments may provide a method for controlling a buck duty cycle of the non-isolated SIDO bi-directional buck-boost DC-DC converter such that a first voltage measured across a first portion of the non-isolated SIDO bi-directional buck-boost DC-DC converter is maintained at less than a voltage of a first load and a second voltage measured across a second portion of the non-isolated SIDO bi-directional buck-boost DC-DC converter is maintained at less than a voltage of a second load.

17 Claims, 11 Drawing Sheets

(51) Int. Cl.
    *H01M 8/04858*    (2016.01)
    *H02M 1/00*        (2006.01)
    *H01M 8/12*        (2016.01)

(52) U.S. Cl.
    CPC ....... *H01M 8/04947* (2013.01); *H02M 1/009* (2021.05); *H01M 2008/1293* (2013.01)

(56) References Cited

U.S. PATENT DOCUMENTS

| | | | |
|---|---|---|---|
| 7,224,085 B2 | 5/2007 | Chen et al. | |
| 7,378,823 B2 * | 5/2008 | Yamanaka | H02M 3/156 323/267 |
| 8,440,362 B2 * | 5/2013 | Richards | H01M 8/249 29/897.3 |
| 8,581,562 B2 * | 11/2013 | Chen | H02M 3/158 323/283 |
| 9,093,901 B2 * | 7/2015 | Xu | H02M 3/1582 |
| 2008/0231115 A1 | 9/2008 | Cho et al. | |
| 2020/0076200 A1 * | 3/2020 | Ballantine | H02J 9/06 |

OTHER PUBLICATIONS

Ming Shang, Haoyu Wang, A ZVS integrated single-input-dual-output DC/DC converter for high step-up applications, IEEE Energy Conversion Congress and Exposition (ECCE), Sep. 26, 2016, United States of America.
Mariya Berly, Prof. Kavitha Issac, Prof. Leela Salim, A Single Input Dual Output DC-DC Converter with Low Component Count, Jun. 2019, vol. 9, Issue No. 6, India.

\* cited by examiner

NON-ISOLATED SINGLE INPUT DUAL-OUTPUT BI-DIRECTIONAL BUCK-BOOST DC-DC CONVERTER

TECHNICAL FIELD

The present invention is generally directed to power generation systems and in particular to direct current (DC) to DC (DC-DC) converters for power generation systems.

BACKGROUND

Electrochemical devices, such as fuel cells, can convert energy stored in fuels to electrical energy with high efficiencies. In a fuel cell system, such as a solid oxide fuel cell (SOFC) system, an oxidizing flow is passed through the cathode side of the fuel cell while a fuel inlet flow is passed through the anode side of the fuel cell. The oxidizing flow is typically air, while the fuel flow can be a hydrocarbon fuel, such as methane, natural gas, pentane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or carbon monoxide to form carbon dioxide. The excess electrons from the negatively charged ion are routed back to the cathode side of the fuel cell through an electrical circuit completed between anode and cathode, resulting in an electrical current flow through the circuit.

SOFC systems may be used to power many different devices under many different arrangements. As an example, SOFC systems may be used to charge batteries and/or to power micro-grids. In SOFC system applications, direct current (DC) to DC (DC-DC) converters are popular to support high efficiency operations of the SOFC systems. Specifically, bi-directional DC-DC converters are widely used in battery charging and micro-grid applications.

Therefore, there is a need for techniques which can overcome one or more limitations stated above, in addition to providing other technical advantages.

SUMMARY

This summary is provided only for the purposes of introducing the concepts presented in a simplified form. This is not intended to identify essential features of the claimed invention or limit the scope of the invention in any manner.

Various embodiments may provide a non-isolated single-input dual-output (SIDO) bi-directional buck-boost direct current (DC) to DC (DC-DC) converters. Various embodiments may provide a method for controlling a buck duty cycle buck duty cycle of the non-isolated SIDO bi-directional buck-boost DC-DC converter such that a first voltage measured across a first portion of the non-isolated SIDO bi-directional buck-boost DC-DC converter is maintained at less than a voltage of a first load and a second voltage measured across a second portion of the non-isolated SIDO bi-directional buck-boost DC-DC converter is maintained at less than a voltage of a second load.

An embodiment includes a method for controlling a non-isolated SIDO bi-directional buck-boost DC-DC converter connected to a DC source, a first load, and a second load. The method includes determining a first voltage of the first load; determining a second voltage of the second load. The method includes controlling a buck duty cycle of the non-isolated SIDO bi-directional buck-boost DC-DC converter such that a first voltage measured across a first portion of the non-isolated SIDO bi-directional buck-boost DC-DC converter is maintained at less than the first voltage of the first load and a second voltage measured across a second portion of the non-isolated SIDO bi-directional buck-boost DC-DC converter is maintained at less than the second voltage of the second load.

In another embodiment, a non-isolated SIDO bi-directional buck-boost DC-DC converter is disclosed. The non-isolated SIDO bi-directional buck-boost DC-DC converter includes a first input terminal configured to connect to a positive terminal of a DC source. The non-isolated SIDO bi-directional buck-boost DC-DC converter further includes a second input terminal configured to connect to a negative terminal of the DC source, a first controllable switch including a respective first side, and a second side. The first side of the first controllable switch is connected to the first input terminal. A second controllable switch includes a respective first side and a second side. The first side of the second controllable switch is connected to the second side of the first controllable switch and the second side of the second controllable switch is connected to the second input terminal. Further, the non-isolated SIDO bi-directional buck-boost DC-DC converter includes a first inductor having a respective first side and a second side. The first side of the first inductor is connected to the second side of the first controllable switch and the first side of the second controllable switch. The non-isolated SIDO bi-directional buck-boost DC-DC converter includes a third controllable switch having a respective first side and a second side. The first side of the third controllable switch is connected to the second side of the first inductor. A fourth controllable switch includes a respective first side and a second side. The first side of the fourth controllable switch is connected to the second side of the third controllable switch. Further, a second inductor includes a respective first side and a second side. The first side of the second inductor is connected to the second side of the fourth controllable switch and the second side of the second inductor is connected to the second side of the second controllable switch and the second input terminal. A fifth controllable switch includes a respective first side and a second side. The second side of the fifth controllable switch is connected to the second side of the first inductor and the first side of the third controllable switch. A sixth controllable switch includes a respective first side and a second side. The first side of the sixth controllable switch is connected to the second side of the fourth controllable switch and the first side of the second inductor. A first voltage output circuit portion includes a respective first side and a second side. The first side of the first voltage output circuit portion is connected to the second side of the fifth controllable switch. The first voltage output circuit portion is configured to output a first DC voltage to a first load. A second voltage output circuit portion includes a respective first side and a second side. The second side of the first voltage output circuit portion, the first side of the second voltage output circuit portion, the second side of the third controllable switch, and the first side of the fourth controllable switch are connected together. The second side of the second voltage output circuit portion is connected to the second side of the sixth controllable switch. Further, the second voltage output circuit portion is configured to output a second DC voltage to a second load. The non-isolated SIDO bi-directional buck-boost DC-DC converter includes a controller connected to the first controllable switch, the second controllable switch, the third controllable switch, the fourth controllable switch, the fifth controllable switch, and the sixth controllable switch. The controller is configured to at least control the first controllable switch and the second controllable switch according to a main duty cycle. The controller is configured to control the third controllable switch and the fifth controllable switch according to a first boost control duty cycle based at least in part on the main duty cycle. Further, the controller is configured to control the fourth controllable switch and the sixth controllable switch according to a second boost control duty cycle based at least in part on the main duty cycle. The controller is configured to control the main duty cycle, the first boost control duty cycle, and the second boost control duty cycle such that when the first load is greater than the second load the first boost control duty cycle is greater than the second boost control duty cycle and when the second load is greater than the first load the second boost control duty cycle is greater than the first boost control duty cycle.

In another embodiment a non-isolated SIDO bi-directional buck-boost DC-DC converter is disclosed. The non-isolated SIDO bi-directional buck-boost DC-DC converter includes a first input terminal configured to connect to a positive terminal of a DC source and a second input terminal configured to connect to a negative terminal of the DC source. A first capacitor includes a respective first side and a second side. The first side of the first capacitor is connected to the first input terminal. A second capacitor includes a respective first side and a second side. The first side of the second capacitor is connected to the second side of the first capacitor and the second side of the second capacitor is connected to the second input terminal. A first controllable switch includes a respective first side and a second side. The first side of the first controllable switch is connected to the first input terminal and the first side of the first capacitor. A second controllable switch includes a respective first side and a second side. The first side of the second controllable switch is connected to the second side of the first controllable switch and the second side of the second controllable switch is connected to the second input terminal. A first inductor includes a respective first side and a second side. The first side of the first inductor is connected to the second side of the first controllable switch and the first side of the second controllable switch. A third controllable switch includes a respective first side and a second side. The first side of the third controllable switch is connected to the second side of the first inductor. A fourth controllable switch includes a respective first side and a second side. The first side of the fourth controllable switch is connected to the second side of the third controllable switch. A second inductor includes a respective first side and a second side. The first side of the second inductor is connected to the second side of the fourth controllable switch and the second side of the second inductor is connected to the second side of the second controllable switch, the second input terminal, and the second side of the second capacitor. A fifth controllable switch includes a respective first side and a second side. The second side of the fifth controllable switch is connected to the second side of the first inductor and the first side of the third controllable switch. A sixth controllable switch includes a respective first side and a second side. The first side of the sixth controllable switch is connected to the second side of the fourth controllable switch and the first side of the second inductor. A first voltage output circuit portion includes a respective first side and a second side. The first side of the first voltage output circuit portion is connected to the second side of the fifth controllable switch. The first voltage output circuit portion is configured to output a first DC voltage to a first load. A second voltage output circuit portion includes a respective first side and a second side. The second side of the first voltage output circuit portion, the first side of the second voltage output circuit portion, the second side of the third controllable switch, the first side of the fourth controllable switch, the second side of the first capacitor, and the first side of the second capacitor are connected together. The second side of the second voltage output circuit portion is connected to the second side of the sixth controllable switch. The second voltage output circuit portion is configured to output a second DC voltage to a second load. The non-isolated SIDO bi-directional buck-boost DC-DC converter further includes a controller connected to the first controllable switch, the second controllable switch, the third controllable switch, the fourth controllable switch, the fifth controllable switch, and the sixth controllable switch. The controller is configured to at least control the first controllable switch and the second controllable switch according to a main duty cycle and control the third controllable switch and the fifth controllable switch according to a first boost control duty cycle based at least in part on the main duty cycle. The controller is configured to control the fourth controllable switch and the sixth controllable switch according to a second boost control duty cycle based at least in part on the main duty cycle. The controller is configured to control the main duty cycle, the first boost control duty cycle, and the second boost control duty cycle such that a first control voltage measured across the first inductor and the third controllable switch is maintained at less than the first DC voltage and a second control voltage measured across the second capacitor is maintained at less than the second DC voltage.

In yet another embodiment a power generation system is disclosed. The power generation system includes a DC source, a first load, a second load, and a non-isolated SIDO bi-directional buck-boost DC-DC converter connected to the DC source, the first load, and the second load. The non-isolated SIDO bi-directional buck-boost DC-DC converter includes a controller configured to control operation of the non-isolated SIDO bi-directional buck-boost DC-DC converter according to any of the methods above and/or wherein the SIDO buck-boost DC-DC converter is the SIDO buck-boost DC-DC converter of any of the above embodiments. In various embodiments, the DC source is a solid oxide fuel cell (SOFC) system.

BRIEF DESCRIPTION OF THE DRAWINGS

For the understanding of exemplary embodiments of the present disclosure, reference is now made to the following descriptions taken in connection with the accompanying figures in which.

Figure 1:
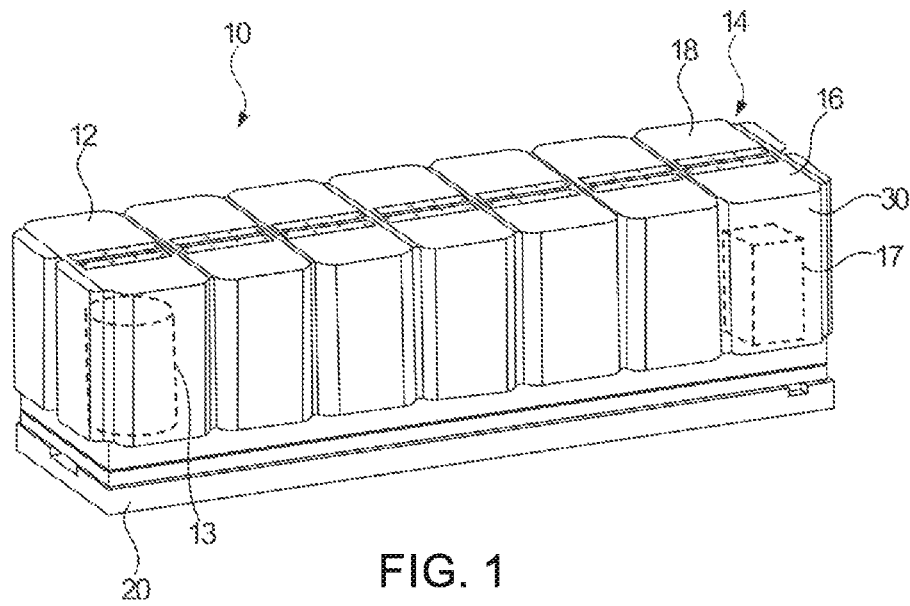
FIG. 1 is a perspective view of a fuel cell system according to various embodiments.

The figures referred to in this description depict embodiments of the disclosure for the purposes of illustration only. One skilled in the art will readily recognize from the following description that alternative embodiments of the systems and methods illustrated herein may be employed without departing from the principles of the disclosure described herein.

DETAILED DESCRIPTION

In the following description, for purposes of explanation, numerous specific details are set forth in order to provide a broad understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide a power system. The power system includes a direct current (DC) source that communicates with two downstream loads and/or devices through a non-isolated single-input dual-output (SIDO) bi-directional buck-boost DC to DC (DC-DC) converter. In various embodiments, a non-isolated SIDO bi-directional buck-boost DC-DC converter may be controllable to output DC voltage from the DC source to the two downstream loads in an equal or unequal manner. In various embodiments, the duty cycle of a non-isolated SIDO bi-directional buck-boost DC-DC converter may be controlled as a function of load power when the power demands of the two downstream loads and/or devices are unequal. Various embodiments may provide a method for controlling a buck duty cycle of the non-isolated SIDO bi-directional buck-boost DC-DC converter such that a first voltage measured across a first portion of the non-isolated SIDO bi-directional buck-boost DC-DC converter is maintained at less than a voltage of a first load and a second voltage measured across a second portion of the non-isolated SIDO bi-directional buck-boost DC-DC converter is maintained at less than a voltage of a second load. In one embodiment, the DC source may be a DC power source, such as a fuel cell system, a photovoltaic system, a thermoelectric system, etc.

Various example embodiments of the present disclosure are described hereinafter with reference to FIG. 1 to FIGS. 7A-7D.

FIG. 1 illustrates an exemplary modular fuel cell system described in U.S. Pat. No. 8,440,362, incorporated herein by reference in its entirety. The modular system may contain modules and components described above as well as in U.S. Pat. No. 9,190,693 issued on Nov. 17, 2015, and entitled "Modular Fuel Cell System" which is incorporated herein by reference in its entirety. The modular design of the fuel cell system enclosure 10 provides flexible system installation and operation.

The modular fuel cell system enclosure 10 includes a plurality of power module housings 12 (containing a fuel cell power module components), one or more fuel input (i.e. fuel processing) module housings 16, and one or more power conditioning (i.e. electrical output) module housings 18. For example, the system enclosure 10 may include any desired number of modules, such as 2-30 power modules, for example, 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as a "module" below.

While one row of power modules 12 is shown, the system may comprise more than one row of power modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. The fuel processing modules 16 include a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each fuel processing module 16. The fuel processing modules 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syngas, biogas, bio-diesel, and other suitable hydrocarbon or hydrogen-containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in the respective power module 12. Furthermore, if internally reforming fuel cells are used, then an external reformer (such as the reformer 17) may be omitted entirely.

The modular fuel cell system enclosure 10 also contains one or more power conditioning modules 18. The power conditioning module 18 includes a cabinet that contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz, and other common voltages and frequencies may be provided.

The fuel processing module 16 and the power conditioning module 18 may be housed in one input/output cabinet 14. If a single input/output cabinet 14 is provided, then the modules 16 and 18 may be located vertically (e.g., power conditioning module 18 components above the fuel processing module 16 desulfurizer canisters/beds) or side by side in the cabinet 14.

As shown in one exemplary embodiment in FIG. 1 one input/output cabinet 14 is provided for one row of six power modules 12, which are arranged linearly side to side on one side of the input/output module 14. The row of power modules may be positioned, for example, adjacent to a building for which the system provides power (e.g., with the backs of the cabinets of the modules facing the building wall). While one row of the power modules 12 is shown, the system may comprise more than one row of power modules 12. For example, as noted above, the system may comprise two rows of power modules stacked back to back.

Each of the power modules 12 and the input/output modules 14 includes a door 30 (e.g., hatch, access panel, etc.) to allow the internal components of the module to be accessed (e.g., for maintenance, repair, replacement, etc.). According to one embodiment, the power modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with the additional power modules 12 or 14 and the bases 20 with minimal rearranging needed for the existing power modules 12 and 14 and the bases 20. If desired, the door 30 to the power module 14 may be on the side rather than on the front of the cabinet.

Figure 2:
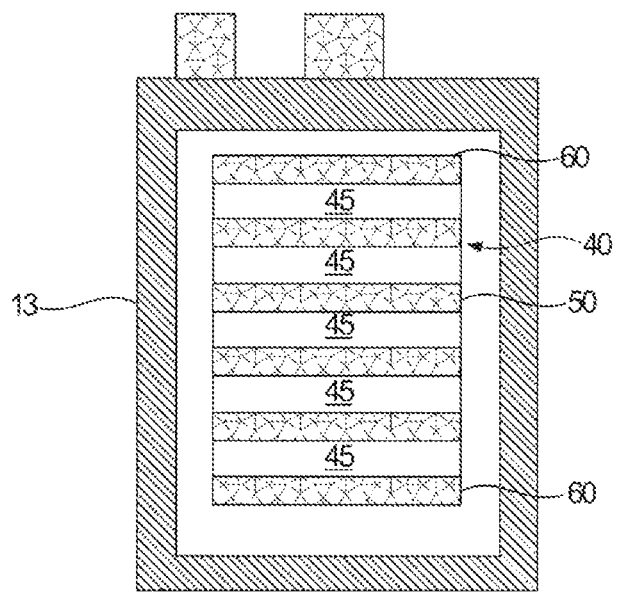
FIG. 2 is a schematic side cross-sectional view of a hot box according to various embodiments.

FIG. 2 illustrates a plan view of a fuel cell system hotbox 13 including a fuel cell stack or column 40. The hotbox 13 is shown to include the fuel cell stack or the column 40. However, the hotbox 13 may include two or more stacks or the columns 40. The stack or column 40 may include the electrically connected fuel cells 45 stacked on one another, with interconnects 50 disposed between the fuel cells 45. The first and last fuel cells 45 in the stack or column are disposed between a respective end plate 60 and the interconnect 50. The end plates 60 are electrically connected to electrical outputs of the fuel cell stack or column 40. The hotbox 13 may include other components, such as fuel conduits, air conduits, seals, electrical contacts, etc., and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni-SSZ or a nickel-samaria doped ceria (SDC) cermet, and a cathode electrode, such as lanthanum strontium manganite (LSM)). The interconnects 50 and/or the end plates 60 may include any suitable gas impermeable and electrically conductive material, such as a chromium-iron alloy, such as an alloy containing 4 to 6 wt % iron and balance chromium. The interconnects 50 electrically connect the adjacent fuel cells 45 and provide channels for fuel and air to reach the fuel cells 45.

Figure 3:
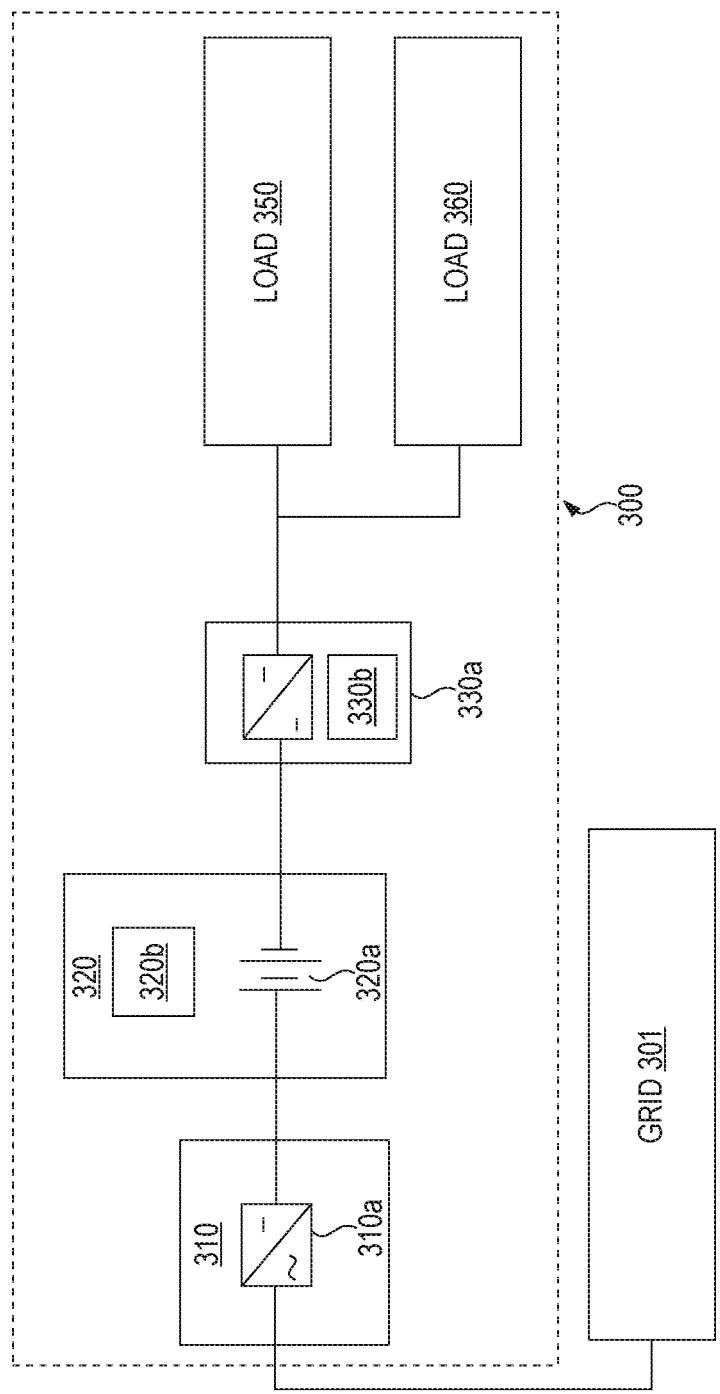
FIG. 3 is a schematic diagram of a system according to various embodiments.

FIG. 3 shows a simplified diagram of a fuel cell power generation system 300 according to embodiments. As shown in FIG. 3, the system 300 may include an Input/Output Module (IOM) 310, a fuel cell system (such as a SOFC system) 320, DC-DC converter 330a, such as a non-isolated SIDO bi-directional buck-boost DC-DC converter, and two loads 350, and 360. The loads 350, and 360 may include any device or group of devices meant to draw power from SOFC system 320, such as an uninterruptible power system (UPS), a "micro-grid," various computers or and/or servers (e.g., servers arranged in a server farm), electromechanical devices, lighting fixtures, climate control systems, etc. The loads 350, and 360 may also be optionally separately connected to other components (including the grid 301, alternative power supplies, batteries, etc.) so that the loads 350, and 360 may optionally draw power when the SOFC system 320 is providing less power than required by the loads 350, and 360. If the loads 350, and 360 are DC loads, then they may be directly electrically connected to the DC-DC converter 330a. If the loads 350, and 360 are alternating current (AC) loads, then a DC-AC inverter may be located between the DC-DC converter 330a output and the input of the loads 350, and 360.

The IOM 310 may connect the SOFC system 320 to the power grid 301. The IOM 310 can include an inverter 310a, as shown FIG. 3A, for converting a DC output from the SOFC system 320 to AC for use by the power grid 301. The IOM 310 can also include other suitable components (not shown) including, but not limited to, controllers, resistive load banks, circuit breakers, and relays. It is to be understood that the IOM 310 is optional, as is connecting the fuel cell system 320 to the grid 301. It is to be further understood that the features or components of the IOM 310 may be incorporated into other components, such as the fuel cell system 320.

The fuel cell system 320 is shown in FIG. 3A to include a generalized power source 320a for the sake of convenience. The fuel cell system 320 and/or the power source 320a may include, for example, the SOFC system shown in FIG. 1 which contains the hot box 13 shown in FIGS. 1 and 2. For the sake of brevity, the fuel cell system 320 is referred to below as "the SOFC system 320". However, it should be understood that the fuel cell system 320 may include other types of fuel cells, such as PEM fuel cells, molten carbonate fuel cells, etc. The SOFC system 320 may also include a number of other suitable components (not shown), such as energy storage devices (e.g., batteries or supercapacitors), fuel valves, fuel and air blowers, circuit breakers, temperature gauges, etc.

The SOFC system 320 may include a controller 320b (as shown in FIG. 3A). The controller 320b may include any suitable logic that can control certain aspects of the SOFC system 320 and/or the power source 320a. For example, the controller 320b may control the fuel flow rate into the SOFC system, the output voltage from the SOFC system, air flow rate into the SOFC system, and fuel recycling rate in the SOFC system, etc. For example, the controller 320*b* may control the output voltage and/or power of SOFC system 320 to other components of the system 300, such as to the IOM 310 and/or the DC-DC converter 330*a*. In addition, the controller 320*b* may communicate, either directly or indirectly, with other components in the system 300 and/or with remote control terminals.

The DC-DC converter 330*a* may provide DC voltage output from the SOFC system 320 at a higher and/or lower voltage compatible with the loads 350, and 360. As shown in FIG. 3A, the DC-DC converter 330*a* may also include a controller 330*b*. The controller 330*b* may be similar to the controller 320*b*, as described above in context of the SOFC system 320, and may perform some similar functions as controller 320*b*, as appropriate for the DC-DC converter 330*a*. Alternatively, a single controller may control both the SOFC system 320 and the DC-DC converter 330*a*. The controller 330*b* may be connected to various components of the DC-DC converter 330*a*. The controller 330*b* may communicate indirectly with other components, such as the controller 320*b*, the loads 350, and 360, etc., via parameters, such as an output voltage of the SOFC system 320, the resistance of the loads 350, and 360, the voltage draw of the loads 350, and 360, etc. In various embodiments, the controller 330*b* may control one or more controllable switches (e.g., thyristors, field effect transistors, such as metal-oxide-semiconductor field-effect transistors (MOSFETs), junction field effect transistors (JFETs) or metal-semiconductor field effect transistors (MESFETs), bipolar transistors, insulated-gate bipolar transistors, series connected MOSFETs (e.g., CMOS), relays, thyristor emulators, and/or diodes in series with insulated-gate bipolar transistors) of the DC-DC converter 330*a* to regulate the voltage output to the loads 350, and 360. For example, the controller 330*b* may control the duty cycles of the controllable switches to control a buck duty cycle of the DC-DC converter 330*a*.

Figure 4:
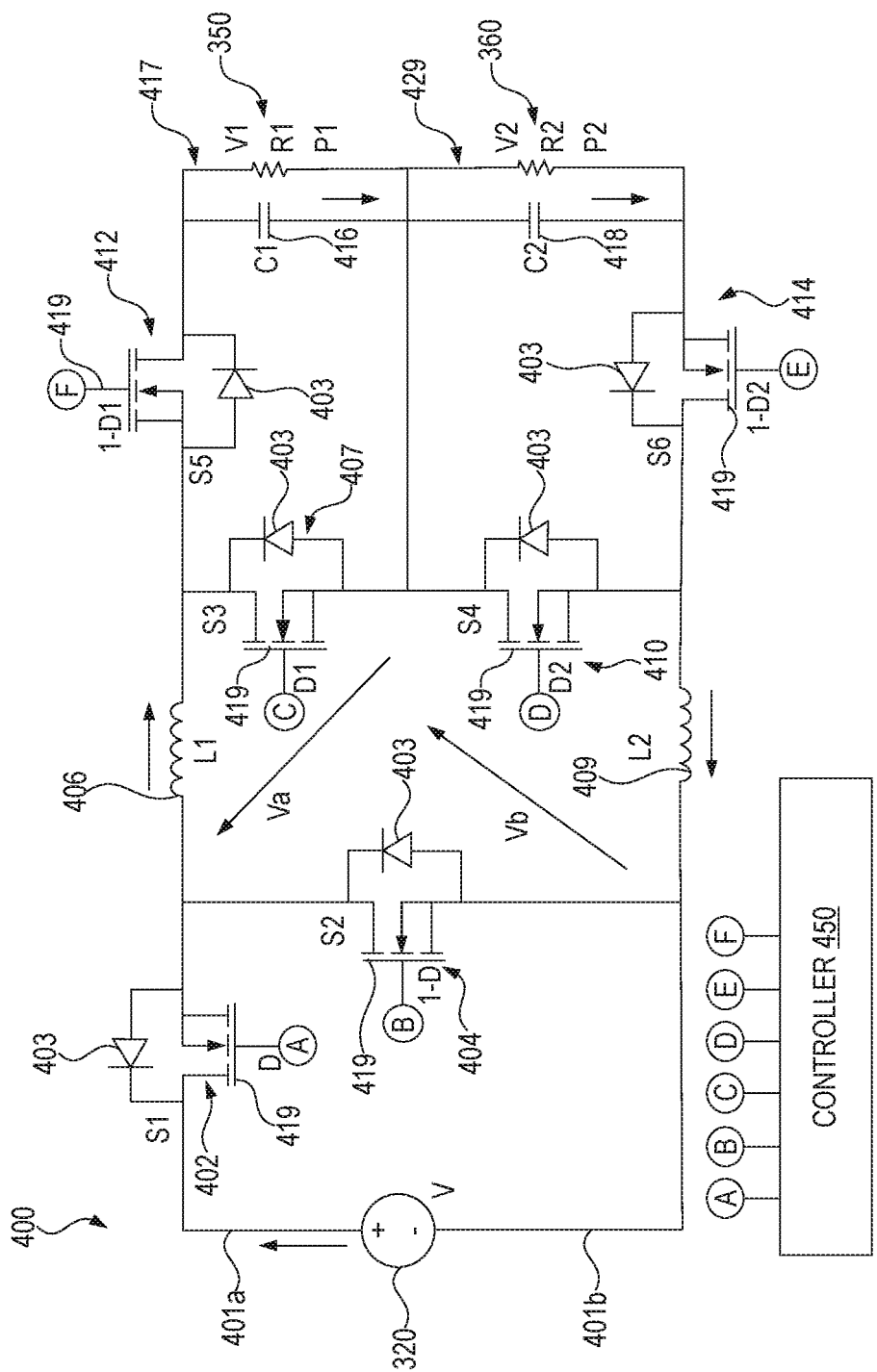
FIG. 4 is a circuit diagram of a non-isolated single-input dual-output (SIDO) bi-directional buck-boost direct current (DC) to DC (DC-DC) converter according to various embodiments.

In various embodiments, the DC-DC controller 330*a* may be a non-isolated SIDO bi-directional buck-boost DC-DC converter, such as a non-isolated SIDO bi-directional buck-boost DC-DC converter 400 illustrated in FIG. 4. The non-isolated SIDO bi-directional buck-boost DC-DC converter 400 may include various controllable switches 402, 404, 407, 410, 412, 414. While illustrated as MOSFET 419 and diode 403 pairs in FIG. 4, the controllable switches 402, 404, 407, 410, 412, and 414 may be any type controllable switch and are not limited to the MOSFET 419 and the diode 403 pairs. The controllable switches 402, 404, 407, 410, 412, and 414 may include any controllable switching architecture, such as thyristors, field effect transistors, such as metal-oxide-semiconductor field-effect transistors (MOSFETs), junction field effect transistors (JFETs) or metal-semiconductor field effect transistors (MESFETs), bipolar transistors, insulated-gate bipolar transistors, series-connected MOSFETs (e.g., CMOS), relays, thyristor emulators, and/or diodes in series with insulated-gate bipolar transistors, etc. Additionally, while illustrated as being of the same type, controllable switches 402, 404, 407, 410, 412, and 414 may be various combinations of different type of switches. Each controllable switch 402, 404, 407, 410, 412, and 414 may have a respective first side and a second side. Each controllable switch 402, 404, 407, 410, 412, and 414 may be opened to prevent current flow across that controllable switches 402, 404, 407, 410, 412, and 414 from one side of the controllable switch 402, 404, 407, 410, 412, and 414 to the other side of the controllable switch 402, 404, 407, 410, 412, and 414. Opening the controllable switch 402, 404, 407, 410, 412, and 414 may be referred to as turning the controllable switch 402, 404, 407, 410, 412, and 414 to an "OFF" state (or deactivated state) in which current does not flow. Each controllable switch 402, 404, 407, 410, 412, and 414 may be closed to allow current flow across that controllable switch 402, 404, 407, 410, 412, and 414 from one side of the controllable switch 402, 404, 407, 410, 412, and 414 to the other side of the controllable switch 402, 404, 407, 410, 412, and 414. Closing the controllable switch 402, 404, 407, 410, 412, and 414 may be referred to as turning the controllable switch 402, 404, 407, 410, 412, and 414 to an "ON" state (or activated state) in which current does flow. The percentage of time that a controllable switch 402, 404, 407, 410, 412, and 414 is in the "ON" state (or activated state) for a time period may be referred to as the duty cycle of the controllable switch 402, 404, 407, 410, 412, and 414.

The controllable switches 402, 404, 407, 410, 412, and 414 may be connected to a controller 450 (for example the controller 330*b* described above). The controller 450 may be configured to control the controllable switches 402, 404, 407, 410, 412, and 414 according to various duty cycles, such as a main duty cycle "D", a first boost control duty cycle "D1", and a second boost control duty cycle "D2". In various embodiments, the different duty cycles, such as the main duty cycle "D", the first boost control duty cycle "D1", and the second boost control duty cycle "D2", may be determined and/or adjusted by the controller 450 to control the buck duty cycle of the non-isolated SIDO bi-directional buck-boost DC-DC converter 400. While illustrated as a single control unit, the controller 450 may be one or more separate control units in communication operating together to control the buck duty cycle of the non-isolated SIDO bi-directional buck-boost DC-DC converter 400 by determining and/or adjusting the different duty cycles, such as the main duty cycle "D", the first boost control duty cycle "D1", and the second boost control duty cycle "D2".

The non-isolated SIDO bi-directional buck-boost DC-DC converter 400 may include a first input terminal 401*a* configured to connect to a positive terminal of a DC source, such as the SOFC system 320. The non-isolated SIDO bi-directional buck-boost DC-DC converter 400 may include a second input terminal 401*b* configured to connect to a negative terminal of the DC source, such as the SOFC system 320. The controllable switch 402 may be connected on one side to the first input terminal 401*a* and on the other side to the controllable switch 404 and the inductor 406. The controllable switch 404 may be connected on one side to the controllable switch 402 and the inductor 406 to the second input terminal 401*b* and the inductor 409. The inductor 406 may be connected on one side to the controllable switch 402 and the controllable switch 404 and on the other side to the controllable switch 407 and the controllable switch 412. The inductor 409 may be connected on one side to the controllable switch 404 and the second input terminal 401*b* to the controllable switch 410 and the controllable switch 414.

The non-isolated SIDO bi-directional buck-boost DC-DC converter 400 may include a first voltage output circuit portion 417 associated with the load 350 and a second voltage output circuit portion 429 associated with the load 360. The loads 350, and 360 are represented by resistors/resistances "R1" and "R2", respectively, in the illustration of the non-isolated SIDO bi-directional buck-boost DC-DC converter 400. The first voltage output circuit portion 417 and the second voltage output circuit portion 429 may include their own respective capacitors 416, and 418 connected in parallel with the loads 350, and 360. The first voltage output circuit portion 417 and the second voltage output circuit portion 429 may connect with one another.

One side of the first voltage output circuit portion 417 may connect to the controllable switch 412 and the other side of the first voltage output circuit portion 417 may connect to the controllable switch 407, the controllable switch 410, and the second voltage output circuit portion 429. One side of the second voltage output circuit portion 429 may connect to the controllable switch 414 and the other side of the second voltage output circuit portion 429 may connect to the controllable switch 407, the controllable switch 410, and the first voltage output circuit portion 417. The first voltage output circuit portion 417 may output a DC voltage to the load 350 and the second voltage output circuit portion 429 may output a DC voltage to the load 360. The controller 450 may receive various parameters (e.g., measurements, indications, etc.) from points in the non-isolated SIDO bi-directional buck-boost DC-DC converter 400 and/or the system 300, such as the load 350, and 360 voltages, resistances, currents, and/or powers, the voltage, resistance, current, and/or power output of the SOFC system 320, the voltage and/or current measurements at or across one or more of the controllable switches 402, 404, 407, 410, 412, and 414, and/or the inductors 406, and 409, or any other parameters. Such parameters may be received from sensing or measuring devices installed in the non-isolated SIDO bi-directional buck-boost DC-DC converter 400 and/or the system 300. The controller 450 may communicate instructions (i.e. apply voltages) to the gate electrodes of the transistors 419 of the controllable switches 402, 404, 407, 410, 412, and 414 via a wired or wireless connection (labeled by letters A to F in FIG. 4) to turn the controllable switches 402, 404, 407, 410, 412 and/or 414 ON or OFF.

The controllable switch 402 and the controllable switch 404 may be controlled according to the main duty cycle "D". For example, the controllable switch 402 may be controlled by the controller 450 to have a duty cycle corresponding to the main duty cycle "D" and the controllable switch 404 may be controlled by the controller 450 to have a duty cycle of 1 minus the main duty cycle "D" (i.e. 1−D).

The controllable switch 407 and the controllable switch 412 may be controlled according to the first boost control duty cycle "D1" associated with the load 350. For example, the controllable switch 407 may be controlled by the controller 450 to have a duty cycle corresponding to the first boost control duty cycle "D1" and the controllable switch 412 may be controlled by the controller 450 to have a duty cycle of 1 minus the first boost control duty cycle "D1" (i.e. 1−D1).

The controllable switch 410 and the controllable switch 414 may be controlled according to the second boost control duty cycle "D2" associated with the load 360. For example, the controllable switch 410 may be controlled by the controller 450 to have a duty cycle corresponding to the second boost control duty cycle "D2" and the controllable switch 414 may be controlled by the controller 450 to have a duty cycle of 1 minus the second boost control duty cycle "D2" (i.e. 1−D2).

In various embodiments, the controller 450 may control the main duty cycle "D", the first boost control duty cycle "D1", and the second boost control duty cycle "D2" such that when the load 350 is greater than the load 360 (i.e. when the voltage V1 drawn by the load 350 is greater than the voltage V2 drawn by the load 360), the first boost control duty cycle "D1" is greater than the second boost control duty cycle "D2" and when the load 360 is greater than the load 350 (i.e. when the voltage V1 drawn by the load 350 is less than the voltage V2 drawn by the load 360), the second boost control duty cycle "D2" is greater than the first boost control duty cycle "D1".

In the non-isolated SIDO bi-directional buck-boost DC-DC converter 400, the voltage output "V1" to load 350 may be determined and controlled by the controller 450 according to the equation:

$$V1 = \frac{V \times D}{1-D1} \cdot \frac{1}{(1+k^2 \times \frac{R1}{R2})} = \frac{V \times D}{1-D1} \cdot \frac{R2}{(R2+R2 \times k^2 \times R1)}$$

where "k" is a voltage constant relating the voltage output "V1" to the load 350 and voltage output "V2" to the load 360 such that V1=V2/k, and "V" is the voltage output "V" of the source, such as the SOFC system 320. As the resistance "R2" of the load 360 approaches infinity (i.e. the load 360 goes to a no-load condition or moves toward stopping drawing power from the SOFC system 320, stated another way R2→∞), the voltage output "V1" to the load 350 may be determined and controlled by the controller 450 according to the equation:

$$V1 = \frac{V \times D}{1-D1}$$

The maximum input voltage "maxV" that can be applied to the split boost without losing controllability (output of buck) may be when the first boost control duty cycle "D1" is zero and determined and controlled by the controller 450 according to the equation:

$$\max V = V1 \times \left(1 + k^2 \times \frac{R1}{R2}\right)$$

To effectively utilize the boost, the buck duty cycle (or main duty cycle "D") may be controlled by the controller 450 such that until the input voltage to the boost reaches this maximum input voltage "maxV", the buck duty cycle (or main duty cycle "D") is maintained at 1.

In a similar manner, in the non-isolated SIDO bi-directional buck-boost DC-DC converter 400, the voltage output "V2" to the load 360 may be determined and controlled by the controller 450 according to the equation:

$$V2 = \frac{V \times D}{1-D2} \cdot \frac{1}{(1+\frac{R2}{R1 \times k^2})} = \frac{V \times D}{1-D2} \cdot \frac{R1 \times k^2}{(R1 \times k^2 + R2)}$$

where "k" is the voltage constant relating the voltage output "V2" to the load 360 and voltage output "V1" to load 350 such that V2=V1*k, and "V" is the voltage output "V" of the source, such as the SOFC system 320. As the resistance "R1" of load 350 approaches infinity (i.e. load 350 goes to a no-load condition or moves toward stopping drawing power from the SOFC system 320, stated another way R→∞), the voltage output "V2" to load 360 may be determined and controlled by the controller 450 according to the equation:

$$V2 = \frac{V \times D}{1 - D2}$$

The control parameter duty cycles that are the first boost control duty cycle "D1" and the second boost control duty cycle "D2" may be determined and controlled by the controller 450 by the respective equations:

$$D1 = 1 - \left( \frac{V \times D}{(R2 + R1 \times k^2)} \times \frac{R2}{V1} \right)$$

and $$D2 = 1 - \left( \frac{V \times D}{(R2 + R1 \times k^2)} \frac{R1 \times k^2}{V2} \right)$$

In various embodiments, the controller 450 may be configured such that for normalized voltage output "V1" to the load 350 and voltage output "V2" to the load 360, if "R2" is greater than "R1" then "D2" may be greater than "D1", and, similarly, if "R1" is greater than "R2" then "D1" may be greater than "D2". The controller 450 may be configured such that the control duty cycle may be a function of load power when the loads 350, and 360 are unequal. Also, the direction of control change may depend on how the loads 350, and 360 are distributed, such as equally distributed or unequally distributed. As the resistance "R2" of the load 360 approaches infinity (i.e. the load 360 goes to a no-load condition or moves toward stopping drawing power from the SOFC system 320, stated another way R2→∞, the controller 450 may be configured such that the second boost control duty cycle "D2" moves toward 1 (or stated another way D2→1. As the resistance "R1" of the load 350 approaches infinity (i.e. load 350 goes to a no-load condition or moves toward stopping drawing power from the SOFC system 320, stated another way R1→∞, the controller 450 may be configured such that the first boost control duty cycle "D1" moves toward 1 (or stated another way D1→1).

The non-isolated SIDO bi-directional buck-boost DC-DC converter 400 may be configured to measure a voltage across the inductor 406 and the controllable switch 407 as the voltage "Va", the voltage across the inductor 409 and the controllable switch 410 as the voltage "Vb". The voltage "Va" and/or voltage "Vb" may be provided to the controller 450 and used for controlling the operation of the non-isolated SIDO bi-directional buck-boost DC-DC converter 400.

Figure 5:
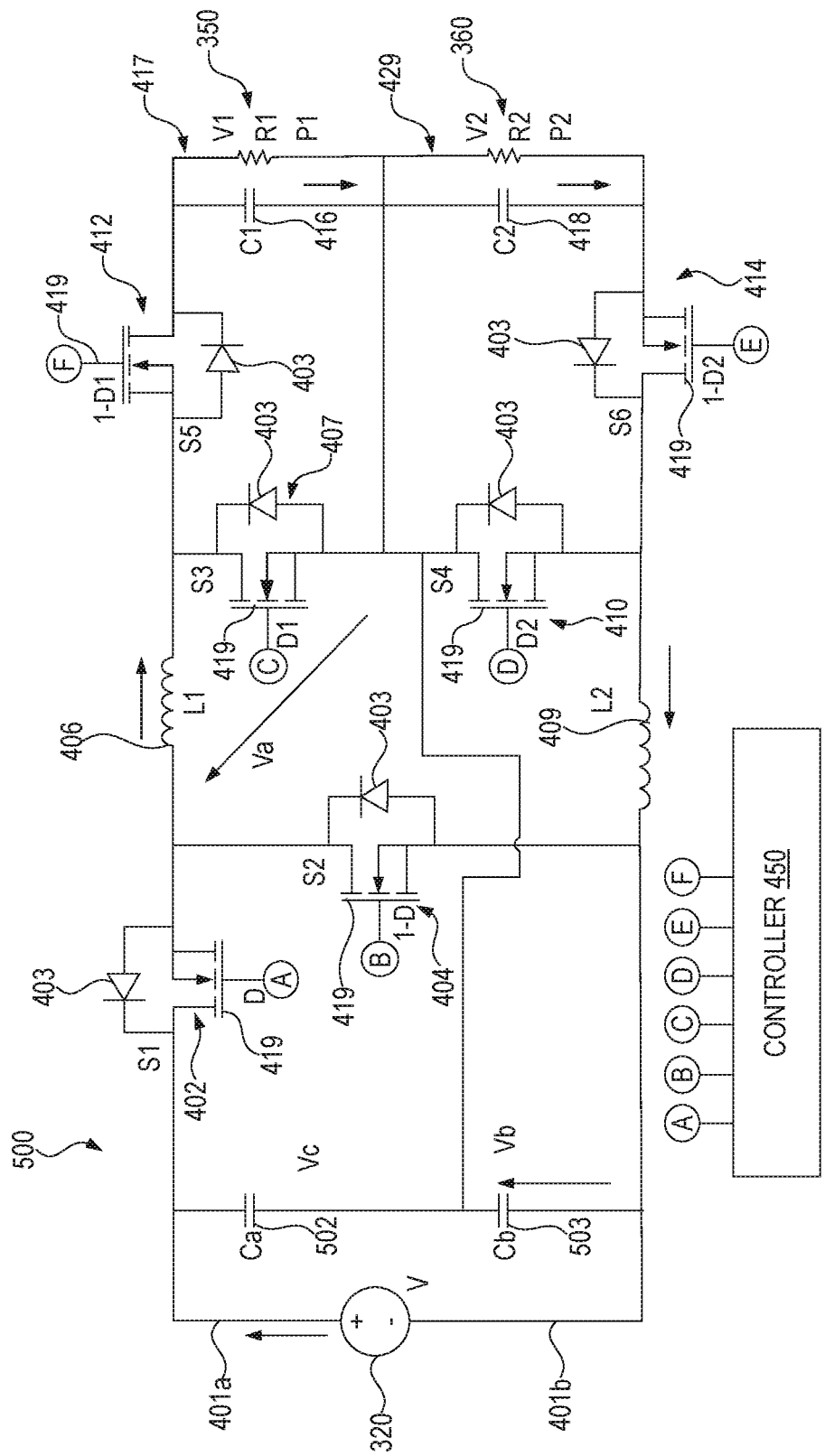
FIG. 5 is a circuit diagram of a non-isolated SIDO bi-directional buck-boost DC-DC converter according to various embodiments.

FIG. 5 illustrates an alternative configuration of a non-isolated SIDO bi-directional buck-boost DC-DC converter 500 according to an embodiment that may be used as the DC-DC controller 330a. The non-isolated SIDO bi-directional buck-boost DC-DC converter 500 may be similar to the non-isolated SIDO bi-directional buck-boost DC-DC converter 400 of FIG. 4, except that capacitors 502 and 503 may be connected to one another and connected to the controllable switch 407, the controllable switch 410, the first voltage output circuit portion 417, and the second voltage output circuit portion 429. The capacitor 502 may also be connected to the first input terminal 401a and the controllable switch 402. The capacitor 503 may also be connected to the second input terminal 401b, the controllable switch 404, and the inductor 409. In addition to the measurements and sensing discussed above for the non-isolated SIDO bi-directional buck-boost DC-DC converter 400, the non-isolated SIDO bi-directional buck-boost DC-DC converter 500 may be configured to measure a voltage across the inductor 406 and the controllable switch 407 as the voltage "Va", the voltage across the capacitor 503 as the voltage "Vb", and the voltage across the capacitor 502 as the voltage "Vc". The voltage "Va", voltage "Vb", and/or voltage "Vc" may be provided to the controller 450 and used for controlling the operation of the non-isolated SIDO bi-directional buck-boost DC-DC converter 500.

In the non-isolated SIDO bi-directional buck-boost DC-DC converter 500, the DC voltages "Va" and "Vb" may be determined by the controller 450 according to the equations:

$$Vb = \frac{V \times D}{1} \cdot \frac{k^2 \times R1}{(R2 + k^2 \times R1)}$$

and $$Va = V \times D - Vb = V \times D - \frac{V \times D}{1} \cdot \frac{k^2 \times R1}{(R2 + k^2 \times R1)}$$

where "k" is the voltage constant relating the voltage output "V2" to the load 360 and voltage output "V1" to the load 350 such that V2=V1*k, "V" is the voltage output "V" of the source, such as the SOFC system 320, "R1" is the resistance of the load 350, and "R2" is the resistance of the load 360.

The controller 450 may be configured such that the main duty cycle "D" is controlled such that "Va" is always less than or equal to "V1". Similarly, the controller 450 may be configured such that the main duty cycle "D" is also controlled such that "Vb" is always less than or equal to "V2". As such, the controller 450 may be configured such that the main duty cycle "D" is maintained at a value that ensures "Va" is less than "V1" and "Vb" is less than "V2". The main duty cycle "D" being maintained at a value that ensures "Va" is less than "V1" and "Vb" is less than "V2" may provide a highest efficiency and one stage of power conversion for the non-isolated SIDO bi-directional buck-boost DC-DC converter 500. Reference tracking and min/max controllers may be used to achieve these conditions (e.g., the main duty cycle "D" being maintained at a value that ensures "Va" is less than "V1" and "Vb" is less than "V2") as the values of "V1" and "V2" may be mutually exclusive. There may be a unique solution of the main duty cycle "D" that may achieve max efficiency and minimum power conversion for any given "V1" and "V2".

FIGS. 6A-6D, collectively, represent process flow diagrams illustrating methods 600, 610, 620, and 630 for controlling a buck duty cycle of a non-isolated SIDO bi-directional buck-boost DC-DC converter, such as the non-isolated SIDO bi-directional buck-boost DC-DC converter 400, and 500, according to various embodiments. In various embodiments, the operations of the methods 600, 610, 620, and 630 may be performed by a controller (e.g., the controller 330b, and 450).

Figure 6A:
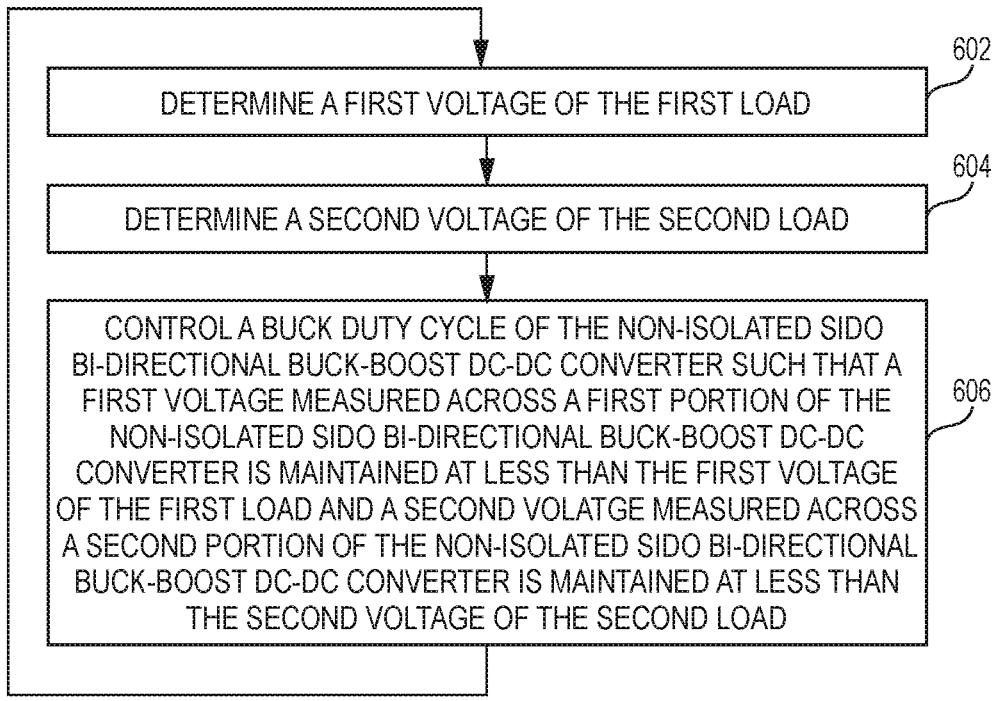
FIGS. 6A, 6B, 6C, and 6D, collectively, represent process flow diagrams illustrating methods for controlling a buck duty cycle of the non-isolated SIDO bi-directional buck-boost DC-DC converter according to various embodiments.

With reference to the method 600 of FIG. 6A, in block 602, the controller may perform operations including determining a first voltage of the first load. For example, the controller may determine the voltage "V1" of the load 350.

In block 604, the controller may perform operations including determining a second voltage of the second load. For example, the controller may determine the voltage "VT" of the load 360.

In block 606, the controller may perform operations including controlling a buck duty cycle of the non-isolated SIDO bi-directional buck-boost DC-DC converter such that a first voltage measured across a first portion of the non-isolated SIDO bi-directional buck-boost DC-DC converter is maintained less than the first voltage of the first load and a second voltage measured across a second portion of the non-isolated SIDO bi-directional buck-boost DC-DC converter is maintained at less than the second voltage of the second load. For example, the controller may control the main duty cycle "D" of the non-isolated SIDO bi-directional buck-boost DC-DC converter such that the voltage "Va" measured across the controllable switch 407 and inductor 406 is maintained at less than the voltage "V1" of the load 350 and the voltage "Vb" across the capacitor 503 is maintained at less than the voltage "VT" of the load 360.

Figure 6B:
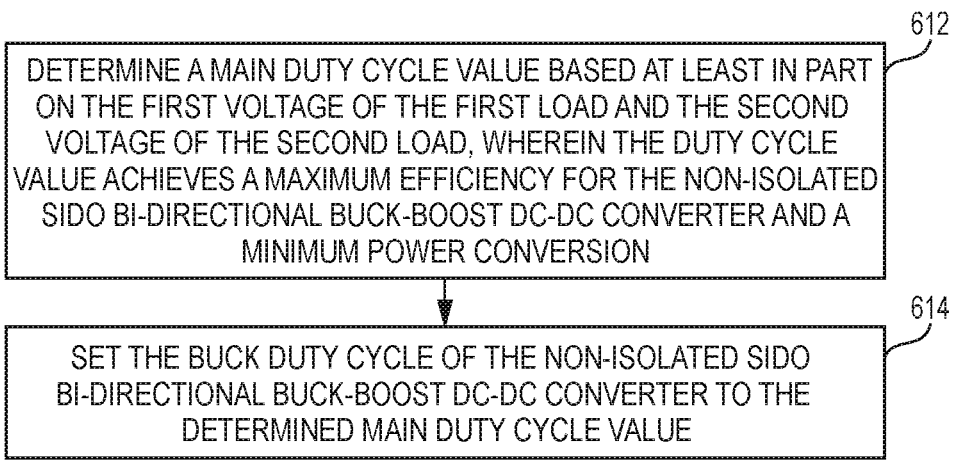

FIG. 6B illustrates a method 610 that may be performed by a controller (e.g., controller 330b, 450) to control the buck duty cycle of the non-isolated SIDO bi-directional buck-boost DC-DC converter in block 606 of method 600.

With reference to the method 610 of FIG. 6B, in block 612, the controller may perform operations including determining a main duty cycle value "D1" based at least in part on the first voltage of the first load (e.g., "V1") and the second voltage of the second load (e.g., "V2"), wherein the duty cycle value achieves a maximum efficiency for the non-isolated SIDO bi-directional buck-boost DC-DC converter and a minimum power conversion. Determining the main duty cycle value "D1" based at least in part on the first voltage of the first load (e.g., "V1") and the second voltage of the second load (e.g., "V2") may include determining the main duty cycle value "D1" based at least in part on the first voltage of the first load (e.g., "V1"), the second voltage of the second load (e.g., "V2"), the first voltage measured across the first portion of the non-isolated SIDO bi-directional buck-boost DC-DC converter (e.g., "Va"), and the second voltage measured across the second portion of the non-isolated SIDO bi-directional buck-boost DC-DC converter (e.g., "Vb"). Determining the main duty cycle value "D1" based at least in part on the first voltage of the first load (e.g., "V1") and the second voltage of the second load (e.g., "V2") may include determining the main duty cycle value "D1" based at least in part on the first voltage of the first load (e.g., "V1"), the second voltage of the second load (e.g., "V2"), the second voltage measured across the second portion of the non-isolated SIDO bi-directional buck-boost DC-DC converter (e.g., "Vb"), and a third voltage measured across a third portion of the non-isolated SIDO bi-directional buck-boost DC-DC converter (e.g., "V c").

In block 614, the controller may perform operations including setting the buck duty cycle of the non-isolated SIDO bi-directional buck-boost DC-DC converter to the determined main duty cycle value "D1".

Figure 6C:
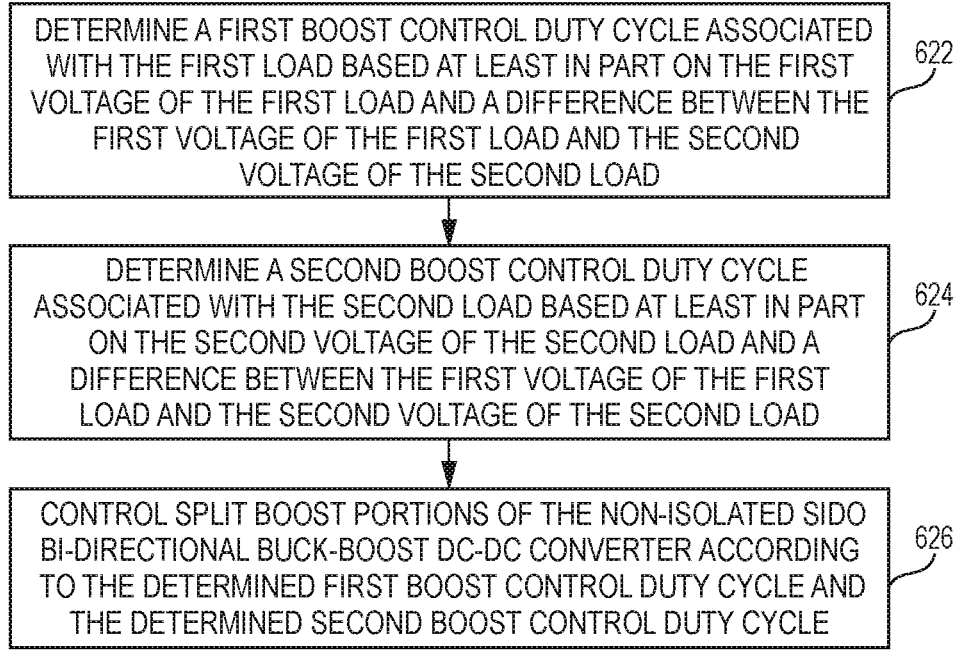

FIG. 6C illustrates the method 620 that may be performed by a controller (e.g., the controller 330b, 450) to control the buck duty cycle of the non-isolated SIDO bi-directional buck-boost DC-DC converter in block 606 of the method 600.

With reference to the method 620 of FIG. 6C, in block 622, the controller may perform operations including determining a first boost control duty cycle "D1" associated with the first load (e.g., the load 350) based at least in part on the first voltage of the first load (e.g., "V1") and a difference between the first voltage of the first load (e.g., "V1 of the load 350") and the second voltage of the second load (e.g., "V2" of the load 360).

In block 624, the controller may perform operations including determining a second boost control duty cycle "D2" associated with the second load (e.g., the load 360) based at least in part on the second voltage of the second load (e.g., "V2 of the load 360") and the difference between the first voltage of the first load ("V1 of the load 350") and the second voltage of the second load ("V2 of the load 360").

In block 626, the controller may perform operations including controlling split boost portions of the non-isolated SIDO bi-directional buck-boost DC-DC converter according to the determined first boost control duty cycle "D1" and the determined second boost control duty cycle "D2".

Figure 6D:
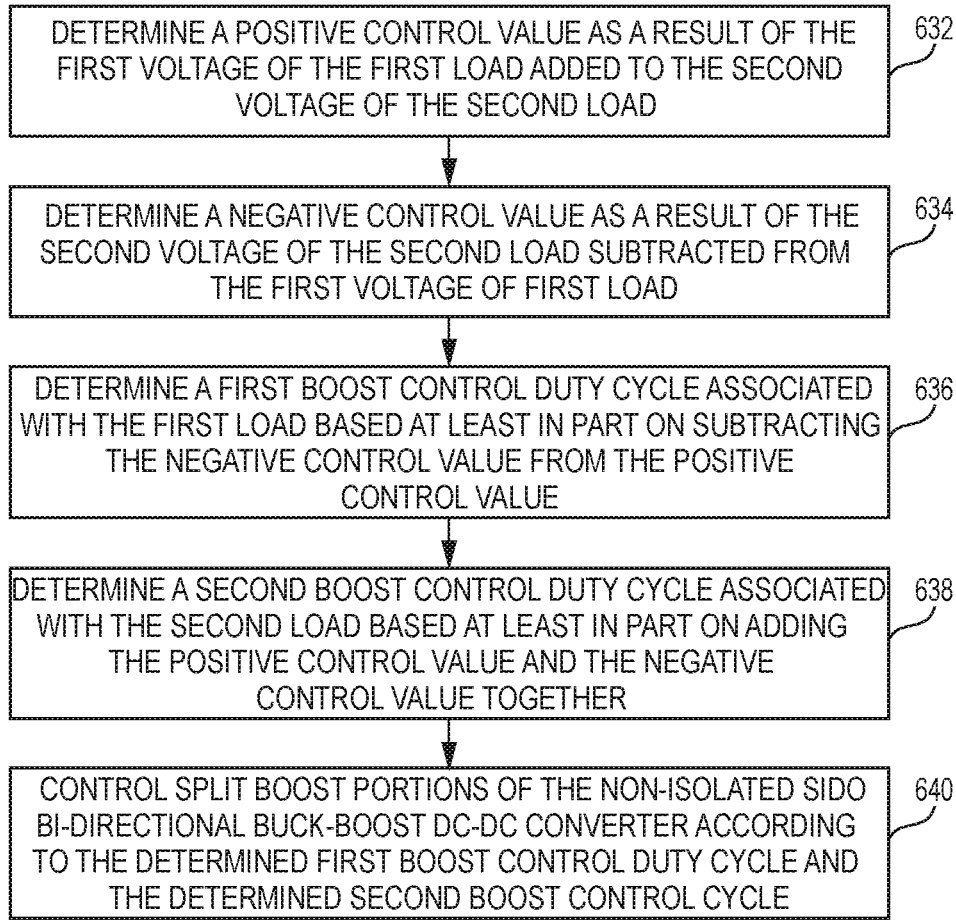

FIG. 6D illustrates the method 630 that may be performed by a controller (e.g., controller 330b, 450) to control the buck duty cycle of the non-isolated SIDO bi-directional buck-boost DC-DC converter in block 606 of method 600.

With reference to the method 630 of FIG. 6D, in block 632, the controller may perform operations including determining a positive control value as a result of the first voltage of the first load (e.g., "V1" of the load 350) added to the second voltage of the second load (e.g., "V2" of the load 360).

In block 634, the controller may perform operations including determining a negative control value as a result of the second voltage of the second load (e.g., "V2" of the load 360) subtracted from the first voltage of the first load (e.g., "V1" of the load 350).

In block 636, the controller may perform operations including determining a first boost control duty cycle "D1" associated with the first load (e.g., the load 350) based at least in part on subtracting the negative control value from the positive control value.

In block 638, the controller may perform operations including determining a second boost control duty cycle "D2" associated with the second load (e.g., the load 360) based at least in part on adding the positive control value and the negative control value together.

In block 640, the controller may perform operations including controlling split boost portions of the non-isolated SIDO bi-directional buck-boost DC-DC converter according to the determined first boost control duty cycle "D1" and the determined second boost control duty cycle "D2".

FIGS. 7A-7D, collectively, represent control logic diagrams illustrating example operations to control a buck duty cycle of the non-isolated SIDO bi-directional buck-boost DC-DC converter, such as non-isolated SIDO bi-directional buck-boost DC-DC converter 400, and 500, according to various embodiments. FIGS. 7A-7D illustrate specific arrangements of control modules 702-754, such as difference controllers, reference tracking and saturation controllers, minimum/maximum (min/max) controllers, division controllers, etc. The specific arrangements of the control modules 702-754 in FIGS. 7A-7D may represent example implementations of the methods 600, 610, 620, and 630 for controlling a buck duty cycle of a non-isolated SIDO bi-directional buck-boost DC-DC converter, such as non-isolated SIDO bi-directional buck-boost DC-DC converter 400, and 500 of FIGS. 6A-6D. In various embodiments, the control modules 702-754 may be implemented in hardware, software, and/or combinations of hardware and software.

Figure 7A:
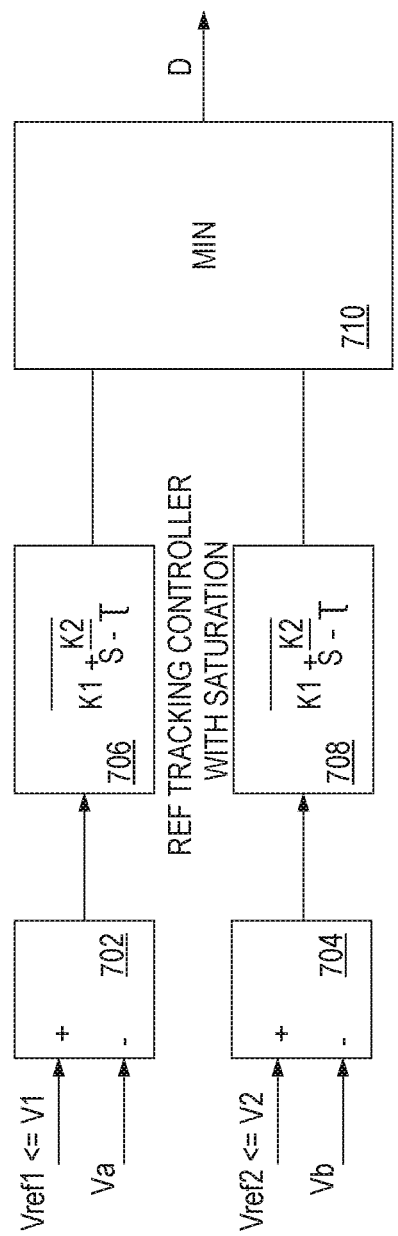
FIGS. 7A, 7B, 7C, and 7D, collectively, represent control logic diagrams illustrating example operations to control a buck duty cycle of the non-isolated SIDO bi-directional buck-boost DC-DC converter according to various embodiments.

FIG. 7A illustrates a control configuration for buck control outputting a main duty cycle "D". A difference controller 702 outputs the difference between "Va" and a reference voltage "Vref 1" which is less than or equal to "V1". That value is output to a reference tracking controller with a saturation 706 which outputs the resulting value to a min/max controller 710. A difference controller 704 outputs the difference between "Vb" and a reference voltage "Vref2" which is less than or equal to "V2". That value is output to a reference tracking controller with a saturation 708 which outputs the resulting value to the min/max controller 710. The min/max controller 710 then outputs the main duty cycle "D" that achieves the maximum efficiency and the minimum power conversion from the values output by reference tracking controllers with the saturation 706, and 708. The control method illustrated in FIG. 7A may maximize the efficiency of a non-isolated SIDO bi-directional buck-boost DC-DC converter, such as the non-isolated SIDO bi-directional buck-boost DC-DC converter 400, and 500 while minimizing the loss of the non-isolated SIDO bi-directional buck-boost DC-DC converter.

Figure 7B:
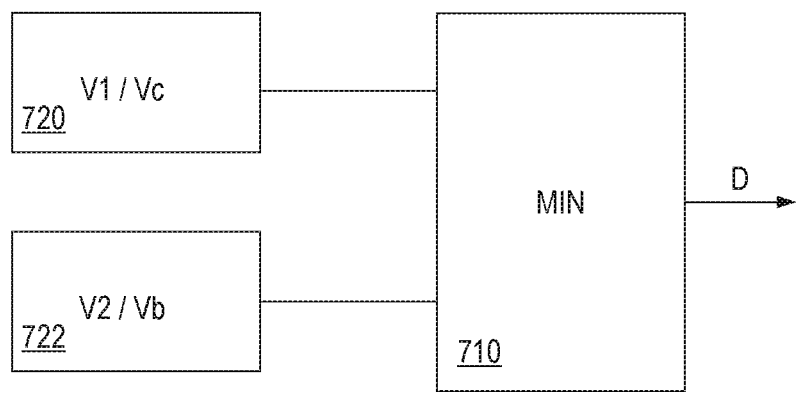

FIG. 7B illustrates another control configuration for buck control outputting a main duty cycle "D". A controller 720 may divide "V1" by "Vc" and a controller 722 may divide "V2" by "Vb". The resulting quotients from the controllers 720, and 722 may be output to the to a min/max controller 710. The min/max controller 710 then outputs the main duty cycle "D" that achieves the maximum efficiency and the minimum power conversion from the values output by the controllers 720, and 722.

Figure 7C:
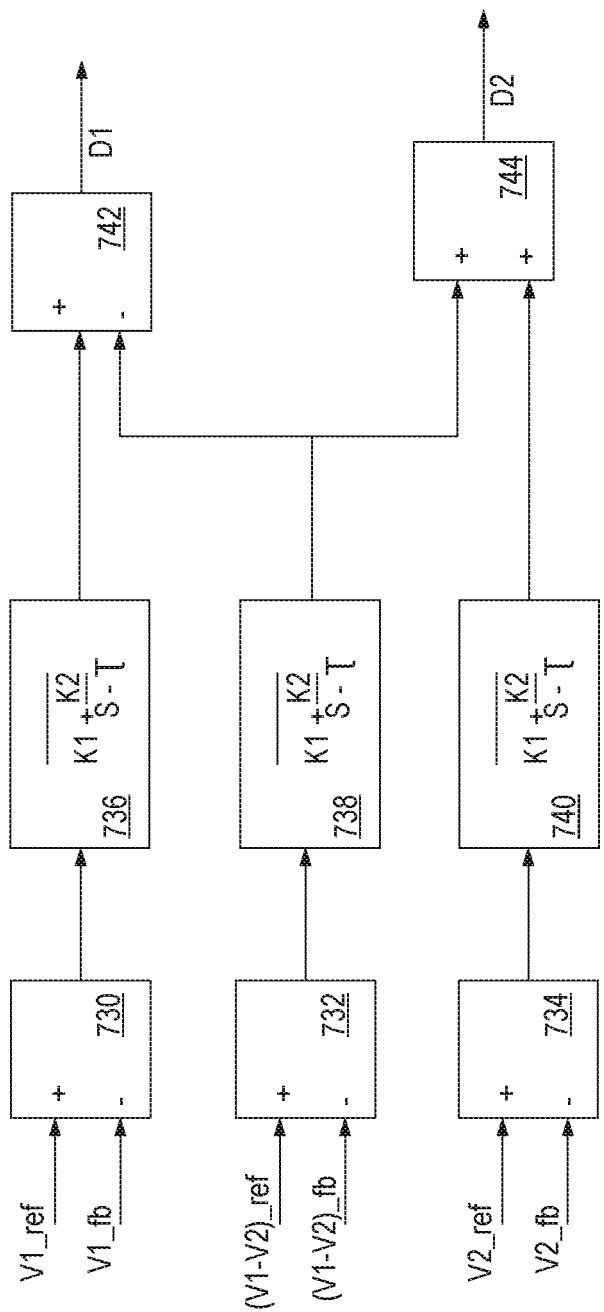

FIG. 7C illustrates a control configuration for boost split output control that may operate with either of the configurations of FIGS. 7A and 7B. In the configuration of FIG. 7C, one control chain of difference controller 730 and reference tracking controller with a saturation 736 controls "V 1", another control chain of difference control 734 and reference tracking controller with a saturation 740 controls "V2", and a third control chain of difference controller 732 and reference tracking controller with a saturation 738 controls the difference between "V1" and "V2" and ensures control is achieved for unbalanced loads by adding or subtracting the output of the other control chains. Specifically, a reference voltage "Vref1" and the feedback voltage of "V1" are provided to the difference controller 730 and the result is fed to the reference tracking controller with the saturation 736. A reference voltage "Vref2" and the feedback voltage of "V2" are provided to the difference controller 734 and the result is fed to the reference tracking controller with the saturation 740. A reference voltage "(V1−V2) ref" and the feedback voltage of "(V1−V2)_fb" are provided to the difference controller 732 and the result is fed to the reference tracking controller with the saturation 738. The output of the reference tracking controller with the saturation the 738 is subtracted from the output of the reference tracking controller with the saturation 736 by the difference controller 742 to generate the output for the first boost control duty cycle "D1". The output of the reference tracking controller with the saturation 738 is added to the output of the reference tracking controller with the saturation 740 by the controller 744 to generate the output for the second boost control duty cycle "D2".

Figure 7D:
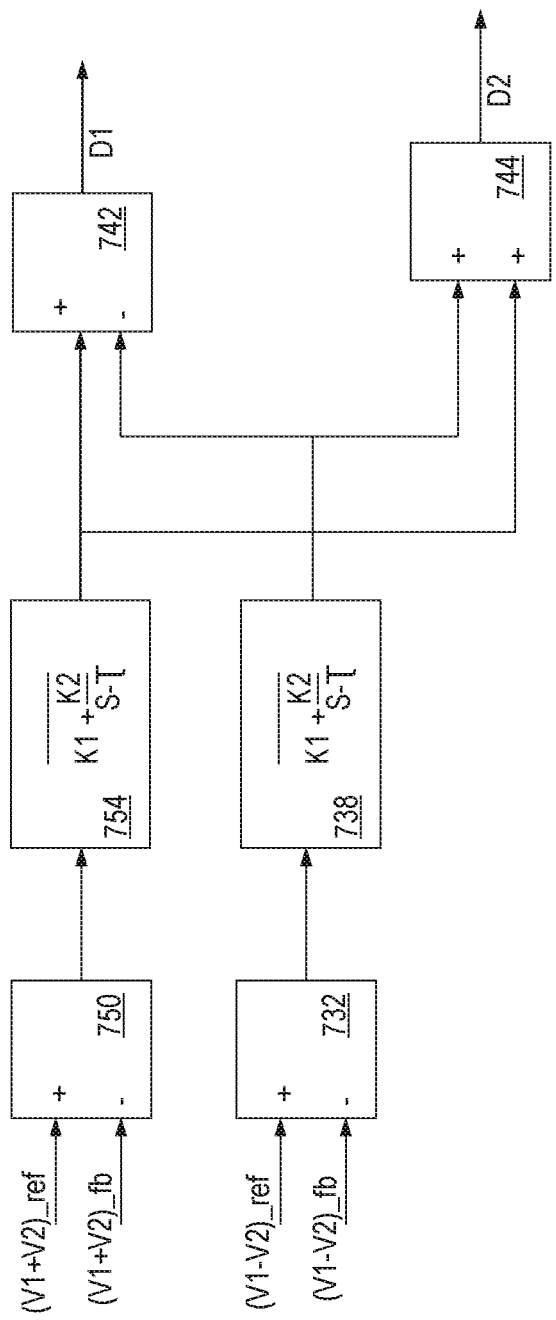

FIG. 7D illustrates another control configuration for boost split output control that may operate with either of the configurations of FIGS. 7A and 7B. In the configuration of FIG. 7C, the boost may be controlled through "V1" being added to "V2" and "V2" being subtracted from "V1". A reference voltage "(V1+V2)_ref" and the feedback voltage of "(V1+V2)_fb" are provided to a difference controller 750 and the result is fed to the reference tracking controller with a saturation 754. A reference voltage "(V1−V2)_ref" and the feedback voltage of "(V1−V2)_fb" are provided to the difference controller 732 and the result is fed to the reference tracking controller with the saturation 738. The output of the reference tracking controller with the saturation 754 is subtracted from the output of the reference tracking controller with the saturation 738 by the difference controller 742 to generate the output for the first boost control duty cycle "D1". The output of the reference tracking controller with the saturation 754 is added to the output of the reference tracking controller with the saturation 738 by the controller 744 to generate the output for the second boost control duty cycle "D2".

As an example, of controlling a buck duty cycle of a non-isolated SIDO bi-directional buck-boost DC-DC converter, such as the non-isolated SIDO bi-directional buck-boost DC-DC converter 400, and 500, according to various embodiments, the "V" output by the source, such as the SOFC system 320, may be 320-480 VDC. When "V1" may be 390 VDC and "V2" may be 390 VDC, the loads may be balanced and the main duty cycle "D1" may be 1 as buck may not be required. When the loads are unbalanced, such as the power "P1" of the load 350 is at a no load and the power "P2" of the load 360 is at 100%, and "V" reaches 400 VDC, the boost becomes uncontrolled as "Va" equals 0 VDC and "Vb" equals 400 VDC. To have control on boost, buck may be operated such that "Vb" will not exceed 390 VDC. The boost control may be set so that "D1" equals 1 and "D2" equals 0 with "D" equal to 0.975. Accordingly, the boost stops switching and the buck starts controlling "V2". The buck control also ensures that unless "Vb" reaches 390 VDC, the buck will operate with "D" equal to 1 ensuring maximum efficiency with an unbalanced load. Similarly, for the other side load unbalance (e.g., where "Vb" equals 0 VDC and "Va" equals 400 VDC) buck will start controlling "V1".

In an embodiment, the functions of the energy storage system, energy storage system technologies, and the energy storage system technologies management system may be implemented in software, hardware, firmware, on any combination of the foregoing. In an embodiment, the hardware may include circuitry designed for implementing the specific functions of the energy storage system, energy storage system technologies, and/or the energy storage system technologies management system. In an embodiment, the hardware may include a programmable processing device configured with instructions to implement the functions of the energy storage system, energy storage system technologies, and/or the energy storage system technologies management system.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as a computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

We claim:

1. A method for controlling a non-isolated single-input dual-output (SIDO) bi-directional buck-boost Direct Current (DC) to DC (DC-DC) converter connected to a DC source, a first load, and a second load, the method comprising:
    determining a first voltage of the first load;
    determining a second voltage of the second load; and
    controlling a buck duty cycle of the non-isolated SIDO bi-directional buck-boost DC-DC converter such that a first voltage measured across a first portion of the non-isolated SIDO bi-directional buck-boost DC-DC converter is maintained at less than the first voltage of the first load and a second voltage measured across a second portion of the non-isolated SIDO bi-directional buck-boost DC-DC converter is maintained at less than the second voltage of the second load.

2. The method of claim 1, wherein controlling the buck duty cycle of the non-isolated SIDO bi-directional buck-boost DC-DC converter comprises:
    determining a main duty cycle value based at least in part on the first voltage of the first load and the second voltage of the second load, wherein the duty cycle value achieves a maximum efficiency for the non-isolated SIDO bi-directional buck-boost DC-DC converter and a minimum power conversion; and
    setting the buck duty cycle of the non-isolated SIDO bi-directional buck-boost DC-DC converter to the determined main duty cycle value.

3. The method of claim 2, wherein determining the main duty cycle value based at least in part on the first voltage of the first load and the second voltage of the second load comprises determining the main duty cycle value based at least in part on the first voltage of the first load, the second voltage of the second load, the first voltage measured across the first portion of the non-isolated SIDO bi-directional buck-boost DC-DC converter, and the second voltage measured across the second portion of the non-isolated SIDO bi-directional buck-boost DC-DC converter.

4. The method of claim 2, wherein determining the main duty cycle value based at least in part on the first voltage of the first load and the second voltage of the second load comprises determining the main duty cycle value based at least in part on the first voltage of the first load, the second voltage of the second load, the second voltage measured across the second portion of the non-isolated SIDO bi-directional buck-boost DC-DC converter, and a third voltage measured across a third portion of the non-isolated SIDO bi-directional buck-boost DC-DC converter.

5. The method of claim 1, wherein controlling the buck duty cycle of the non-isolated SIDO bi-directional buck-boost DC-DC converter comprises:
    determining a first boost control duty cycle associated with the first load based at least in part on the first voltage of the first load and a difference between the first voltage of the first load and the second voltage of the second load;
    determining a second boost control duty cycle associated with the second load based at least in part on the second voltage of the second load and the difference between the first voltage of the first load and the second voltage of the second load; and
    controlling split boost portions of the non-isolated SIDO bi-directional buck-boost DC-DC converter according to the determined first boost control duty cycle and the determined second boost control duty cycle.

6. The method of claim 1, wherein controlling the buck duty cycle of the non-isolated SIDO bi-directional buck-boost DC-DC converter comprises:
    determining a positive control value as a result of the first voltage of the first load added to the second voltage of the second load;
    determining a negative control value as a result of the second voltage of the second load subtracted from the first voltage of the first load;
    determining a first boost control duty cycle associated with the first load based at least in part on subtracting the negative control value from the positive control value;

determining a second boost control duty cycle associated with the second load based at least in part on adding the positive control value and the negative control value together; and controlling split boost portions of the non-isolated SIDO bi-directional buck-boost DC-DC converter according to the determined first boost control duty cycle and the determined second boost control duty cycle.

7. The method of any of claims 1-6, wherein the DC source is a solid oxide fuel cell (SOFC) system.

8. A non-isolated single-input dual-output (SIDO) bi-directional buck-boost Direct Current (DC) to DC (DC-DC) converter, comprising:
a first input terminal configured to connect to a positive terminal of a DC source;
a second input terminal configured to connect to a negative terminal of the DC source;
a first controllable switch having a respective first side and a second side, the first side of the first controllable switch connected to the first input terminal;
a second controllable switch having a respective first side and a second side, the first side of the second controllable switch connected to the second side of the first controllable switch and the second side of the second controllable switch connected to the second input terminal;
a first inductor having a respective first side and a second side, the first side of the first inductor connected to the second side of the first controllable switch and the first side of the second controllable switch;
a third controllable switch having a respective first side and a second side, the first side of the third controllable switch connected to the second side of the first inductor;
a fourth controllable switch having a respective first side and a second side, the first side of the fourth controllable switch connected to the second side of the third controllable switch;
a second inductor having a respective first side and a second side, the first side of the second inductor connected to the second side of the fourth controllable switch and the second side of the second inductor connected to the second side of the second controllable switch and the second input terminal;
a fifth controllable switch having a respective first side and a second side, the second side of the fifth controllable switch connected to the second side of the first inductor and the first side of the third controllable switch;
a sixth controllable switch having a respective first side and a second side, the first side of the sixth controllable switch connected to the second side of the fourth controllable switch and the first side of the second inductor;
a first voltage output circuit portion having a respective first side and a second side, the first side of the first voltage output circuit portion connected to the second side of the fifth controllable switch, wherein the first voltage output circuit portion is configured to output a first DC voltage to a first load;
a second voltage output circuit portion having a respective first side and a second side, wherein:
the second side of the first voltage output circuit portion, the first side of the second voltage output circuit portion, the second side of the third controllable switch, and the first side of the fourth controllable switch are connected together,
the second side of the second voltage output circuit portion is connected to the second side of the sixth controllable switch, and
the second voltage output circuit portion is configured to output a second DC voltage to a second load; and
a controller connected to the first controllable switch, the second controllable switch, the third controllable switch, the fourth controllable switch, the fifth controllable switch, and the sixth controllable switch, wherein the controller is configured to:
control the first controllable switch and the second controllable switch according to a main duty cycle,
control the third controllable switch and the fifth controllable switch according to a first boost control duty cycle based at least in part on the main duty cycle,
control the fourth controllable switch and the sixth controllable switch according to a second boost control duty cycle based at least in part on the main duty cycle, and
control the main duty cycle, the first boost control duty cycle, and the second boost control duty cycle such that when the first load is greater than the second load the first boost control duty cycle is greater than the second boost control duty cycle and when the second load is greater than the first load the second boost control duty cycle is greater than the first boost control duty cycle.

9. The non-isolated SIDO bi-directional buck-boost DC-DC converter of claim 8, wherein the first controllable switch, the second controllable switch, the third controllable switch, the fourth controllable switch, the fifth controllable switch, and the sixth controllable switch are metal-oxide-semiconductor field-effect transistors (MOSFETs).

10. A power generation system, comprising:
a direct current (DC) source;
a first load;
a second load; and
a non-isolated single-input dual-output (SIDO) bi-directional buck-boost DC (DC-DC) converter of claim 8 connected to the DC source, the first load, and the second load.

11. The power generation system of claim 10, wherein the DC source is a solid oxide fuel cell (SOFC) system.

12. A non-isolated single-input dual-output (SIDO) bi-directional buck-boost Direct Current (DC) to DC (DC-DC) converter, comprising:
a first input terminal configured to connect to a positive terminal of a DC source;
a second input terminal configured to connect to a negative terminal of the DC source;
a first capacitor having a respective first side and a second side, the first side of the first capacitor connected to the first input terminal;
a second capacitor having a respective first side and a second side, the first side of the second capacitor connected to the second side of the first capacitor and the second side of the second capacitor connected to the second input terminal;
a first controllable switch having a respective first side and a second side, the first side of the first controllable switch connected to the first input terminal and the first side of the first capacitor;
a second controllable switch having a respective first side and a second side, the first side of the second controllable switch connected to the second side of the first controllable switch and the second side of the second controllable switch connected to the second input terminal;

a first inductor having a respective first side and a second side, the first side of the first inductor connected to the second side of the first controllable switch and the first side of the second controllable switch;

a third controllable switch having a respective first side and a second side, the first side of the third controllable switch connected to the second side of the first inductor;

a fourth controllable switch having a respective first side and a second side, the first side of the fourth controllable switch connected to the second side of the third controllable switch;

a second inductor having a respective first side and a second side, the first side of the second inductor connected to the second side of the fourth controllable switch and the second side of the second inductor connected to the second side of the second controllable switch, the second input terminal, and the second side of the second capacitor;

a fifth controllable switch having a respective first side and a second side, the second side of the fifth controllable switch connected to the second side of the first inductor and the first side of the third controllable switch;

a sixth controllable switch having a respective first side and a second side, the first side of the sixth controllable switch connected to the second side of the fourth controllable switch and the first side of the second inductor;

a first voltage output circuit portion having a respective first side and a second side, the first side of the first voltage output circuit portion connected to the second side of the fifth controllable switch, wherein the first voltage output circuit portion is configured to output a first DC voltage to a first load;

a second voltage output circuit portion having a respective first side and a second side, wherein:
the second side of the first voltage output circuit portion, the first side of the second voltage output circuit portion, the second side of the third controllable switch, the first side of the fourth controllable switch, the second side of the first capacitor, and the first side of the second capacitor are connected together,
the second side of the second voltage output circuit portion is connected to the second side of the sixth controllable switch, and
the second voltage output circuit portion is configured to output a second DC voltage to a second load; and a controller connected to the first controllable switch, the second controllable switch, the third controllable switch, the fourth controllable switch, the fifth controllable switch, and the sixth controllable switch, wherein the controller is configured to:
control the first controllable switch and the second controllable switch according to a main duty cycle,
control the third controllable switch and the fifth controllable switch according to a first boost control duty cycle based at least in part on the main duty cycle,
control the fourth controllable switch and the sixth controllable switch according to a second boost control duty cycle based at least in part on the main duty cycle, and
control the main duty cycle, the first boost control duty cycle, and the second boost control duty cycle such that a first control voltage measured across the first inductor and the third controllable switch is maintained at less than the first DC voltage and a second control voltage measured across the second capacitor is maintained at less than the second DC voltage.

13. The non-isolated SIDO bi-directional buck-boost DC-DC converter of claim 12, wherein the first controllable switch, the second controllable switch, the third controllable switch, the fourth controllable switch, the fifth controllable switch, and the sixth controllable switch are metal-oxide-semiconductor field-effect transistors (MOSFETs).

14. A power generation system, comprising:
a direct current (DC) source;
a first load;
a second load; and
the non-isolated single-input dual-output (SIDO) bi-directional buck-boost DC to DC (DC-DC) converter of claim 12 connected to the DC source, the first load, and the second load.

15. The power generation system of claim 14, wherein the DC source is a solid oxide fuel cell (SOFC) system.

16. A power generation system, comprising:
a direct current (DC) source;
a first load;
a second load; and
a non-isolated single-input dual-output (SIDO) bi-directional buck-boost DC to DC (DC-DC) converter connected to the DC source, the first load, and the second load, wherein the non-isolated SIDO bi-directional buck-boost DC-DC converter comprises a controller configured to control operation of the non-isolated SIDO bi-directional buck-boost DC-DC converter to perform:
determining a first voltage of the first load;
determining a second voltage of the second load; and
controlling a buck duty cycle of the non-isolated SIDO bi-directional buck-boost DC-DC converter such that a first voltage measured across a first portion of the non-isolated SIDO bi-directional buck-boost DC-DC converter is maintained at less than the first voltage of the first load and a second voltage measured across a second portion of the non-isolated SIDO bi-directional buck-boost DC-DC converter is maintained at less than the second voltage of the second load.

17. The power generation system of claim 16, wherein the DC source is a solid oxide fuel cell (SOFC) system.

* * * * *